United States Patent Office 3,243,414
Patented Mar. 29, 1966

3,243,414
ELECTRICAL RESISTIVE POLYURETHANE RESIN FROM A MIXTURE OF POLYOLS CONTAINING NONADECANEDIOL
Elmer J. De Witt and Walter T. Murphy, Cuyahoga Falls, Ohio, assignors to The B. F. Goodrich Company, New York, N.Y., a corporation of New York
No Drawing. Filed Apr. 3, 1963, Ser. No. 270,152
8 Claims. (Cl. 260—77.5)

This invention relates to novel polyurethane plastics and to a process for their preparation. More particularly, this invention is concerned with the production of hard, high-impact strength, electrical resistive polyurethane resins, which involves the use of a unique nonadecanediol monomer in their manufacture.

The production of polyurethane resins by the reaction of organic polyisocyanates and active hydrogen containing compounds is well known. Many of these resinous polyurethane compositions are hard but possess extreme brittleness, while those which are hard and somewhat flexible are usually opaque. Furthermore, urethane resins in general are not noted for possessing very good electrical insulating properties.

It is, therefore, an object of this invention to provide a polyurethane resin which has the properties of hardness, flexibility, good impact strength, chemical resistance, good electrical insulating characteristics, and transparency. It is a further object to provide a new polyurethane resin containing as one of its monomeric constituents a diol derived from $C_{18}$ monounsaturated or diunsaturated fatty acids or mixtures thereof.

The polyurethane resin embodied herein is the heat-curable reaction product of a mixture of monomers comprising (1) one mole of an isomeric mixture of nonadecanediols corresponding to the structure:

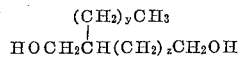

wherein y and z are both integers within the range of 0 to 15 and the total of integers y and z is always 15; (2) from 1.5 to 3.0 moles of an aromatic or cycloaliphatic diisocyanate; (3) from 0.4 to 1.9 moles of a straight chain glycol having four to ten carbon atoms; and (4) from 0.07 to 1.1 moles of a polyol having at least three carbon atoms. The said reaction product is further characterized by being essentially free of unreacted isocyanate or hydroxyl groups.

The methods for producing the nonadecanediol and the polyurethane resin incorporating said diol are presented in detail in the discussion that follows, accompanied by detailed description of specific embodiments of the invention.

THE NONADECANEDIOL MONOMER

The nonadecanediol (i.e., hydroxymethyl stearyl alcohol) monomer used in the preparation of the polyurethane in accordance with this invention is a unique mixture of isomeric diols which is obtained by the reduction of an isomeric mixture of either hydroxymethyl stearic acid (i.e., the methylol derivative of stearic acid), the alkyl esters of hydroxymethyl stearic acid, formyl-stearic acid (i.e., the aldehydo derivative of stearic acid), the alkyl esters of formyl-stearic acid, or mixtures of the aforesaid compounds. These intermediate compounds are advantageously obtained by the hydroformylation of $C_{18}$ unsaturated fatty acids such as oleic acid and linoleic acid and mixtures thereof, or the alkyl esters of these acids.

A convenient source of oleic and linoleic acids is the tall oil fatty acid mixture which is recovered by fractional distillation of crude tall oil, a mixture of rosin acids (related to abietic acid) and of fatty acids. Tall oil is obtained by acidifying the black liquor skimmings of the alkaline paper pulp industry. The fatty acids fraction separated from crude tall oil generally contains approximately equal amounts of oleic and linoleic acids, not more than 2 percent of rosin acids, small amounts of saturated acids such as palmitic, adipic, and sebacic acids, and no linolenic acid. (See Kirk and Othmer, Encyclopedia of Chemical Technonolgy, 1954, volume 13, pages 572-577.) For instance, commercial tall oil fatty acids derived from the kraft paper processing of the southern pine normally contain about 53% oleic acid, 42% linoleic acid, 3% saturated acids, and 2% rosin acids and unsaponifiables. Oleic acid, linoleic acid, and mixtures thereof are readily esterified with a $C_1$ to $C_8$ aliphatic monohydric alcohol by conventional esterification techniques.

Several methods are known for attaching a methylol or aldehyde group to an unsaturated fatty acid at a point of unsaturation on its carbon chain. We found that it is desirable to use the well known hydroformylation reaction, better known as the "oxo-process." The oxo-reaction is widely used in industry to convert various olefins to aldehydes and alcohols. Generally speaking, the oxo-process involves reacting olefinic compounds with a mixture of carbon monoxide and hydrogen, commonly referred to as synthesis gas, under high temperatures and pressures in the presence of a cobalt catalyst. Pressures generally range from about 2,000 to 4,500 pounds per square inch and the temperature may be within the range of about 125° to 225° C., the lower temperatures favoring the production of the aldehydo compound and the higher temperatures promoting the synthesis of the alcohol derivatives.

In our application of the oxo-reaction the feed stock is either oleic acid, a mixture of oleic acid and linoleic acid (tall oil fatty acids), or the alkyl esters of said acids or acid mixtures. The reaction and chemistry are essentially the same for the acid and ester feed stocks. When the alkyl esters of the acids are used, it is preferred that the alkyl group of said ester have from one to eight carbon atoms, for example, methyl, ethyl, n-propyl, isopropyl, n-butyl, isobutyl, n-amyl, isoamyl, n-hexyl, the isomeric hexyls, n-heptyl, the isomeric heptyls, n-octyl, and the isomeric octyls such as 2-ethylhexyl. The alkyl radicals containing from one to three carbon atoms are most preferred.

For efficient hydroformylation of the $C_{18}$ unsaturated acid moiety, the oxo-catalyst concentration is from about 0.5 to about 1.5%, based on the weight of the feed stock, of cobalt in the form of a salt thereof. Representative catalysts are dicobalt octacarbonyl charged as a solution in benzene (a procedure for preparing this catalyst is given by I. Wender et al., J. Am. Chem. Soc., vol. 73, page 2656), cobaltous acetate in water solution, and cobaltous carbonate. Many other cobalt compounds are well known as suitable catalysts in the oxo-process art. The pressure generally is 1425 to 2500 p.s.i.g., reaction time 0.25 to 1.0 hour, the ratio of $H_2$ to CO in the synthesis gas ranges from 2:1 to 1:2, and the temperature is usually in the range of about 125° to 200° C. When the hydroformylation is carried out at from about 125° C. up to about 145° C., the product is nearly all aldehydo derivatives. As the reaction temperature is increased within the range of 145° C. up to about 180° C., less aldehyde and correspondingly more methylol derivatives are found in the product mixture. At 180° C. and above, the product is primarily an alcohol, i.e., hydroxymethyl stearic acid (or alkyl hydroxymethyl stearic) containing from 3 to 10% aldehyde compounds.

After the above-described oxoation reaction is completed, the cobalt catalyst is decomposed by (1) venting the autoclave and treating the product with hydrogen at 160° C., or (2) treating the product with dilute hydrochloric acid solution at 100° C. The former method yields a pink product containing metallic cobalt and cobalt salts. The latter method, the preferred technique, yields a white to yellow thick oil product free of cobalt salts.

In the hydroformylation of oleic (9-octadecenoic) and linoleic (9,12-octadecadienoic) acids, or esters, to obtain the methylol and/or aldehydo derivatives thereof, a mixture of isomers is produced due to (a) the tendency of the methylol or aldehyde function to add to either carbon atom of an unsaturated linkage, and (b) shifting of the double bonds along the chain of carbon atoms during reaction. Stated differently, the methylol or aldehyde function may be attached to any of the 2nd through 17th carbon atoms of the chain of the stearic acid moiety, but is generally located at any of the 9th through 13th carbon atoms of said chain. For example, the hydroformylation of oleic acid produces a mixture largely comprised of 9- and 10-hydroxymethyl (and/or formyl-) stearic acids, while the oxoation of linoleic acid produces a mixture largely comprised of 9-, 10-, 11-, 12-, and 13-hydroxymethyl (and/or formyl-) stearic acids. In both cases small amounts of 2-, 3-, 4-, 5-, 6-, 7-, 8-, 14-, 15-, 16-, and 17-hydroxymethyl (and/or formyl-) stearic acids are formed during reaction due to the aforementioned random bond shifting. More explicitly, the oxoated product may be pictorially represented as (I)
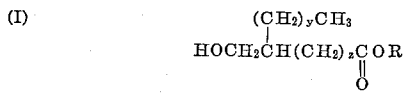

in the case of the methylol derivative, and as (II)

in the case of the aldehydo derivative, wherein R is selected from the group consisting of hydrogen and alkyl radicals having from one to eight carbon atoms, $y$ and $z$ are both integers within the range of 0 to 15, the total of integers $y+z$ is always 15, and furthermore, $y$ and $z$ are predominantly from 7 to 8 when said oxoated compound is prepared from oleic acid, and $y$ is predominantly from 4 to 8 and $z$ from 7 to 11 when the oxoated compound is prepared from linoleic acid. More particularly, the predominant isomers are believed to comprise about 90% of the oxoated product. Surprisingly the hydroxymethylation or formylation of linoleic acid or its alkyl esters by oxoation is almost completely selective with respect to one of the double bonds while the other one is hydrogenated. For example, no more than about 1 to 5 percent of linoleic acid is converted to the dihydroxymethyl and/or diformyl-stearic acid.

As aforementioned, the nonadecanediol monomer used in the polyurethane preparation according to this invention is obtained by the reduction of the oxoated products described above, i.e., the reduction of the $C_{19}$ methylol and/or aldehydo acids and esters as represented by the Formulae I and II. Thus, the nonadecanediol may be pictorially represented as

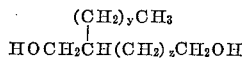

wherein $y$ and $z$ are defined as before.

It has been found that several well known hydrogenation methods are not suited to convert the oxoated product to the $C_{19}$ diol useful herein. For example, high-pressure hydrogenation in the presence of palladium, platinum or Raney nickel catalyst, or reduction using sodium borohydride ($NaBH_4$) or aluminum isopropoxide will convert an aldehyde group to an alcohol (i.e., methylol) but will not cause any appreciable reduction of acid or ester groups to an alcohol. It has been found that treating the oxoated product with lithium aluminum hydride ($LiAlH_4$), or more preferably, a high-pressure hydrogenation catalyzed by copper chromite, not only results in essentially complete reduction of aldehyde groups but also gives adequate reduction of acid and ester groups to the alcohol. In more specific terms, from about 95 to 100% of theoretically complete reduction is achieved with these latter reducing processes. Both methods are well known in the hydrogenation art. Although these two reduction techniques are preferred, other procedures suitable for the hydrogenation of aldehyde and acid groups may be employed.

The reduction of the oxoated product employing lithium aluminum hydride is carried out in a suitable solvent for the feed stock such as tetrahydrofuran, benzene, bis(2-methoxyethyl)ether, diethyl ether, and the like. The diluent may be, but does not need to be, a solvent of the product. Generally 0.1 to 0.15 part of $LiAlH_4$ are used per part of oxoated product. The reaction is conducted at about 25 to 40° C. for approximately 30 to 60 minutes. The crude nonadecanediol is recovered by initially treating the reaction mixture with a lower aliphatic monohydric alcohol which reacts with excess $LiAlH_4$. The caustic thus formed is neutralized with an inorganic acid and the product is then filtered and water washed to remove inorganic impurities. This washing operation may be facilitated by first putting the product into organic solvent solution, such as in diethyl ether or benzene. The solvent is preferably removed from the nonadecanediol by low temperature (25 to 70° C.), low pressure distillation or by steam distillation. If steam distillation is used for solvent stripping, the nonadecanediol is subsequently dried by heating at around 100° C. under reduced pressure.

The copper chromite catalyzed hydrogenation is usually carried out at 3000 to 4000 p.s.i.g. of hydrogen pressure at a temperature of 250 to 280° C. for a period of approximately 1 to 3 hours. Solvents such as methanol, ethanol, n-propanol, or iso-propanol are helpful in quantities of about 0.5 to 3 parts per part of oxoated product charged. From about 5 to about 10 weight percent of copper chromite, based on the weight of the oxoated feed stock, are needed to obtain a reasonable reaction rate. The copper chromite is desirably stabilized or activated by having combined therewith an appropriate metallic oxide, such as the oxide of barium, cobalt, canadium or cadmium, or a mixture thereof. The stabilizer is generally about 8 to 15 wt. percent, based on total catalyst weight. The copper chromite catalysts are commercially available. When hydrogenation is completed, the catalyst is removed from the mixture by filtration and the solvent is stripped to yield the crude nonadecanediol. Dilute inorganic acid treatment and water washing are desirable to remove residual metallic impurities.

The crude nonadecanediol thus obtained by reduction of the oxoated product is generally of about 80 to 95% purity. Its hydroxyl number (theoretical=374) is from about 340 to 360. It will be shown hereinbelow that this so-called "crude nonadecanediol" can be employed in the polyurethane recipe with good results. It will also be shown that a more pure nonadecanediol, which is obtained by distillation of the crude product, produces a polyurethane of higher quality with respect to such properties as color and impact value.

The crude nonadecanediol mixture has a boiling point range at 0.06 to 0.1 mm. of Hg absolute pressure of from about 123 to 180° C. The distilled, comparatively high-purity nonadecanediol has a boiling point range at 0.1 mm. Hg pressure of 164 to 179° C. and at 0.03 to 0.065 mm. Hg, 161–170° C. Its hydroxyl number ranges from about 360 to 370, and it is 94 to 99% pure.

It is desirable that the nondecanediol, as well as the other hydroxyl containing ingredients used in the polyurethane formulation, be substantially free of water contamination so as to avoid the deleterious side reaction of water with the isocyanate groups to be later introduced (i.e., such side reactions as the formation of amines, disubstituted urea, and carbon dioxide). Although not always a necessary expedient, the simple precaution of heating the nonadecanediol for a short period to between 70 and 100° C. at low pressure, e.g., 1 to 20 mm. Hg, insures that the monomer is in a sufficiently anhydrous condition.

THE POLYURETHANE RESIN

The polyurethane resin of the present invention is the polymeric reaction product of a mixture comprising (1) the above-described, unique nonadecanediol mixture, (2) an organic diisocyanate, (3) a dihydric alcohol, and (4) an aliphatic polyol.

The organic diisocyanate may be any of a wide variety of suitable aromatic or cycloaliphatic diisocyanates, either alone or as isomer mixtures or as mixtures of diisocyanates. Representative compounds include 2,4-toluene diisocyanate, 2,6-toluene, diisocyanate, 1,4-cyclohexane diisocyanate, 4-isopropyl-1,3-phenylene diisocyanate, 1,5-naphthalene diisocyanate, mesitylene diisocyanate, xylene diisocyanate, the diphenyl methane diisocyanates such as diphenyl methane-p,p′-diisocyanate, and the like. The preferred isocyanate reactant is the isomer mixture which contains 80% of 2,4-toluene diisocyanate and 20% of 2,6-toluene diisocyanate, often called toluene diisocyanate, 80/20.

The dihydric alcohol utilized in preparing the polyurethane serves as a chain extender in the polymer composition. The dihydric alcohol is a saturated, aliphatic glycol which contains from 4 to 10 carbon atoms, preferably 4 to 8 carbon atoms, such as 1,4-butanediol, hexamethylene diol-1,6 and octamethylene diol-1,8. The most preferred glycol is 1,4-butanediol.

The function of the polyol is that of a cross-linking agent to impart added flexibility and resilience to the resin. The polyol reagent must be completely miscible with the other monomeric ingredients used in preparing the polyurethane. The hydroxy radicals of the soluble polyol should be primary and/or secondary radicals, i.e.,

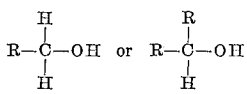

where R is aliphatic. Polyols containing only tertiary hydroxyl radicals, for example,

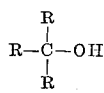

should not be used as they are not sufficiently reactive to provide proper curing to obtain a reslient polyurethane. The polyol should not contain nitro groups or amino hydrogen atoms, i.e., hydrogen attached directly to nitrogen atoms, as these provide non-resilient materials. Furthermore, the useful, soluble polyol should contain at least 3 primary and/or secondary hydroxyl radicals to obtain branching in the finished polymer and although the polyol must have at least 3 carbon atoms, it may contain up to 40 carbon atoms; however, at such large carbon atom contents, it should contain more hydroxyl radicals, e.g., up to 8 reactive hydroxyl groups. The preferred polyol is a trihydric alcohol, trimethylol propane being especially preferred. Other useful triols include glycerol, 1,2,4-butanetriol, trimethylol ethane, phenyl trimethylol methane, 1,1,1-trimethylol-2,4,4-trimethyl pentane, 1,1,1-trimethylol hexane, 1,2,6-hexanetriol, 1,2,4-hexanetriol, and the like. Exemplary of other useful polyols is N,N,N′,N′-tetrakis (2-hydroxy propyl)ethylene diamine. Thus, it is seen that the polyol employed is generally aliphatic in nature although it can contain aromatic or other substituents and, preferably, consists of carbon, hydrogen and oxygen.

The ratios of the ingredients employed in producing the polyurethane are adjusted so that there is essentially no free or unreacted isocyanate or hydroxyl groups in the resinous product. A small amount of unreacted isocyanate groups or hydroxyl groups may be tolerated, but it is desirable that they are essentially reacted in order to obtain products having good and constituent physical characteristics.

For each mole of the nonadecanediol monomer the amounts of the other reactants are: about 1.5 to 3 moles of the diisocyanate, 0.4 to 1.9 moles of the dihydric alcohol, and 0.07 to 1.1 moles of the polyol, the molar ratios of the latter three reactants being adjusted within the specified ranges, so that a product is obtained in which there is essentially no free hydroxyl or isocyanate. The preferred proportions are 1 mole of nonadecanediol, about 2 moles of diisocyanate, about 0.5 mole of glycol, and about 0.12 to 0.33 mole of polyol.

In accordance with the methods of this invention, the aforesaid reactants are prepared as a free-flowing, but viscous, homogeneous solution or mixture which is readily pourable, using one of two general methods hereinafter described. The uncured polymer composition is easily handled for limited periods in casting, molding, coating and similar operations. Curing the polyurethane at a temperature of at least 80° C. and preferably no higher than about 150° C. for periods of approximately 4 to 24 hours yields the high impact, hard resin of this invention. The preferred range for curing is between about 100 and 130° C. Low temperature cures, e.g., from between about 25 and 80° C. give a hard material but it is somewhat weaker. Pressure-molded objects may be obtained from the polymer in about ten minutes at 80° C. to 150° C. but a subsequent post-cure as above-described is desirable to impart the optimum physical properties to the resin.

One method for producing the pourable polymer composition comprises first preparing a homogeneous mixture of the nonadecanediol, the glycol, and polyol and drying the solution, if necessary, by applying a vacuum to the mixing vessel. The solution of alcohol reagents is easily obtained with stirring at from 100 to 120° C. The diisocyanate is mixed with this alcohol solution to form the urethane polymer. The reaction is exothermic and the temperature should be maintained below about 100° C. by external cooling of the reaction vessel. The temperature of the isocyanate-hydroxyl monomers reaction mixture is desirably maintained above about 70° C. to prevent desolubilization therein and the formation of an emulsion. Moreover, at temperatures above about 80° C., the viscosity is low enough to permit quite easy mixing and handling. A drawback of this polymer preparation technique is the short "pot-life" of the liquid polyurethane composition obtained, that is, the period of time in which it is pourable is relatively brief. Consequently, subsequent to the mixing of the diisocyanate with the diols and polyol solution, the resulting polymer must be poured for casting or molding within about four minutes. A longer pot retention renders the polymer too viscous for processing and it eventually becomes an immobile mass.

The preferred method for producing the pourable polymer composition involves a prepolymer technique. The nondecanediol and diisocyanate are blended at a temperature within the range of about 70 to about 100° C. to give a clear, viscous, liquid prepolymer. Since the reaction is exothermic, external cooling is generally required to prevent the temperature from exceeding the aforesaid 100° C. The reaction is usually completed within 20 to about 30 minutes. The glycol and polyol are then blended with the prepolymer at 70° C. to 100° C., preferably at 80 to 100° C., to obtain the desired polyurethane composition. The advantage of the prepolymer technique is that a pot-life or pourability time for the polyurethane of up to about ten minutes is obtained.

The presence of gas bubbles in the liquid polyurethane may be noted in occasional polymer preparations. These bubbles are caused by the reaction of isocyanate groups with small amounts of residual moisture (this condition is unlikely if there has been a previous drying step) or carboxyl groups in the nonadecanediol monomer; these side reactions evolve carbon dioxide, thus forming gas bubbles that are loathe to escape from the viscous liquid polyurethane. Since the bubbles cause surface imperfections in the cured resin castings, it is advisable to remove them from the liquid polymer before it is poured into the molds. This is a simple operation which consists of merely pulling a vacuum, e.g., 25 to 50 mm. of Hg, on the fluid polymer for a few minutes. The small amounts of amines or ureas formed in the polymer by the aforesaid side reactions do not have any apparent harmful effect on the ultimate cured product.

The heat-cured polyurethane resin of this invention is a thermoset-type material with a heat distortion temperature according to ASTM method D648–56 of 40 to 60° C. The resin not only has good hardness, good impact strength and outstanding electrical insulating properties, but it is also flexible and transparent. The resin is approximately 85% as transparent as clear methyl methacrylate polymer.

The cured resin exhibits exceptionally good resistance to water and chemical degradation. It is insoluble at room temperature in such strong, typical polyurethane solvents as N,N-dimethyl formamide, tetrahydrofuran, dioxane and the like.

When the nonadecanediol monomeric constituent of the polyurethane is the crude, undistilled product, the resin has a yellow tint and an impact strength of about 1 ft.-lb./inch of notch (ASTM D256–56). The use of distilled nonadecanediol results in a colorless resin with a higher impact resistance, about 2 to 3 ft.-lbs./inch.

The polyurethane resins embodied herein are, owing to their combined hardness, flexibility, strength, chemical and moisture resistance, and good electrical properties, especially useful for coating electrical wire, and encapsulating or potting electrical components and electronic devices.

The examples and specific embodiments of the invention that follow are illustrative only and are not meant to limit the scope of the invention in any way. For purposes of brevity, the hydroxymethyl stearyl alcohol mixture is often referred to as nonadecanediol in the examples and elsewhere in the specification. In the examples, parts means parts by weight unless otherwise designated. Mole ratios are based on the moles of nonadecanediol. The hydroxyl number reported for the nonadecanediol is the milligrams of potassium hydroxide equivalent to the OH content of a one gram sample of the nonadecanediol isomer mixture.

*Example I*

A. PREPARATION OF NONADECANEDIOL 150 grams of the methyl esters of fractionated tall oil fatty acids and 20 ml. of a catalyst solution (a solution of dicobalt octacarbonyl in benzene containing 0.675 millimol of the cobalt compound per ml. of the solution) were charged to a 845 ml. autoclave for oxidation of the tall oil esters with synthesis gas. Hydroformylation conditions were 2400 p.s.i.g. and 135° C. for 20 hours. At this relatively low reaction temperature, the product was substantially the aldehyde derivative of methyl stearate. Catalyst residues were removed therefrom by treatment with dilute hydrochloric acid followed by water-washing.

To a two-liter, 3-necked flask equipped with a stirrer, condenser, and dropping funnel were added 300 ml. of tetrahydrofuran (THF) and 200 ml. of bis(2-methoxyethyl) ether to serve as reaction diluent, and 22 grams of LiAlH$_4$ reducing agent. A nitrogen atmosphere was maintained in the flask. The formyl-methyl stearate dissolved in 200 ml. of THF was added to the flask over a 30 minute period. Stirring was continued for an additional hour at about 25° C. The reduced product was formed as a lumpy slurry in the diluent medium. The excess LiAlH$_4$ was "killed-off" by adding methanol and then diluted hydrochloric acid to the mixture. The product was extracted from the diluent using diethyl ether solvent. The ether solution was washed with dilute KOH solution, given several water washes, and then dried by passage through anhydrous Na$_2$SO$_4$. The ether was stripped by passing the solution through a rotoevaporator at about 50° C. and 20 mm. Hg to yield 108 grams of the bottoms product, a light yellow oil at 50° C. and an oily solid at 23° C. This unrefined hydroxymethyl stearyl alcohol mixture (i.e., the nonadecanediol isomeric mixture) had a hydroxyl number of 340 (theory=374).

B. PREPARATION OF THE POLYURETHANE

The recipe for the urethane polymer, using the nonadecanediol prepared above, was as follows:

| | Molecular Weight | Parts | Mole Ratio |
|---|---|---|---|
| Nonadecanediol | 329 | 100 | 1.00 |
| 1,4-butanediol | 90 | 13.7 | 0.50 |
| Trimethylol propane | 134 | 13.6 | 0.33 |
| Toluene diisocyanate, 80/20 mixture of 2,4- and 2,6-isomers | 174 | 105.8 | 2.00 |

The nonadecanediol, 1,4-butanediol, and trimethylol propane were mixed together and heated with agitation to 100° C. at an absolute pressure of 2 mm. of Hg to insure that there was no residual moisture present. The mixture was cooled to about 40° C. and the toluene diisocyanate was added thereto with stirring. The reaction was carried out at about 80–100° C. for 2 minutes.

The polymer, a clear liquid, was poured into shallow aluminum dishes and tensile molds for curing. Curing at 130° C. for 15 minutes produced a polymer which, while still hot, was a high-modulus rubber-like material; after cooling the polymer to room temperature, a hard (Shore D hardness=80°), glossy, slightly yellow, transparent, flexible, high impact resin was obtained. To illustrate this resin's unusual physical properties, a ¼ inch thick disk of same was struck several hard blows with a steel hammer without shattering. Driving a screwdriver into the surface and to a depth of about ¼ of the thickness of the disk did not start any cracks. A nail was driven through another ¼ inch disk. The disk did not shatter, nor even crack, and it held the nail tenaciously. Overnight aging of the urethane resin in a 130° C. oven did not noticeably detract from its good physical properties. There were no signs of heat degradation.

A 24 hour room temperature cure of the polyurethane composition yielded a resin of considerably less impact strength. A disk formed from the low temperature cured material shattered when struck with the hammer.

*Example II*

A. PREPARATION OF HIGH-PURITY NONADECANEDIOL 145 parts of tall oil acids ("Acintol FA-2") were oxoated with synthesis gas at 2400 p.s.i.g. and 180° C., using a solution of 7 parts of cobaltous acetate in 30 parts of water as the catalyst. The hydroformylated product, a dark oil comprising substantially hydroxymethyl stearic acid and a small amount of formyl-stearic acid, was diluted with diethyl ether, treated with HCl solution, water-washed and dried. The ether was then removed by rotoevaporation. The product was converted to the nonadecanediol isomer mixture by reduction with LiAlH$_4$ (30 parts) in THF solvent (1300 parts) at 65° C. After treating the mixture with methanol at room temperature to destroy the excess LiAlH$_4$, about 50 parts of concentrated hydrochloric acid solution were added, resulting in two phases, aqueous and organic, which were then separated. The nonadecanediol was extracted from the aqueous phase with 300 ml. of diethyl ether containing 50 ml. of tetrahydrofuran. This solution was treated with dilute KOH solution, washed and dried. The solvent was stripped in a rotoevaporator.

The crude nonadecanediol was batch distilled through an 8" x ¾" column packed with beryl saddles operated at an absolute pressure of 0.1 mm. Hg. The results are as follows:

| Fraction No. | Overhead Temp., ° C. | Weight Percent |
|---|---|---|
| 1 | 123-164 | 18 |
| 2 | 164-179 | 69 |
| 3 | 179 | 5 |
| Residue | | 8 |

Fraction 2, a white solid, was essentially a pure mixture of the nonadecanediol isomers. Its hydroxyl number was 369 (theory=374).

B. PREPARATION OF THE POLYURETHANE

A polyurethane was prepared employing the procedure and recipe of the preceding Example I-B, except that the distilled nonadecanediol was substituted for the more crude nonadecanediol of the said previous example. The polymer was cast into molded sheets and disks which were cured at 130° C. for 24 hours. The resin exhibited all the good physical characteristics of that produced in Example I-B, and in addition produced a clear, colorless, transparent sheet in contrast to the somewhat yellow resin previously made. The optical properties of the polyurethane were characterized in a Beckman DK-2 spectrophotometer. A sheet of the resin 40 mils thick was placed in a ¼ cm. thick quartz cell containing water, and the degree of transmission of light in the visible spectrum (350 to 700 millimicrons) through the specimen was measured. The results showed that on the average 83% of the light was transmitted through the polyurethane sheet. The non-brittleness of the resin was demonstrated by folding a sheet 40 mils thick in half without causing it to fracture or crack.

*Example III*

POLYURETHANE MADE WITH RICINOLELYL ALCOHOL

This example illustrates that when the unique nonadecanediol mixture peculiar to the polyurethane of this invention is substituted by another diol, even though similar in structure, the resulting resin is of inferior quality.

The recipe for the polyurethane of this example was:

| | Mol. Wt. | Parts | Mole Ratio |
|---|---|---|---|
| 12-hydroxyoctadecenol [1] | 312 | 100 | 1.00 |
| 1,4-butanediol | 90 | 14.4 | 0.50 |
| Trimethylol propane | 134 | 14.2 | 0.33 |
| Toluene diisocyanate, 80/20 | 174 | 11.6 | 2.00 |

[1] "Adol 40"; a $C_{18}$ mono-unsaturated 1,12-diol material with a hydroxyl number of 360.

The procedure used in Example I-B was used in this run. The 12-hydroxy octadecenol, butanediol, and trimethylol propane were mixed, the solution dried at 100° C. under a vacuum, cooled to 30° C., and the isocyanate added thereto and reacted with stirring for 2 minutes. The temperature was about 80° C. when the clear liquid solution was poured into tensile molds and aluminum dishes. The polymer was cured at 130° C. for 16 hours and then cooled to room temperature. The resin samples were brittle and exhibited poor impact strength compared to the resins of this invention. This was shown by qualitative impact tests such as striking ¼ inch thick polymer disks with a mallet and driving nails through the disks. The disks of this example were readily fractured by such treatment.

*Example IV*

A. PREPARATION OF NONADECANEDIOL

A hydroxymethyl stearic acid isomeric mixture was prepared by the oxoation of tall oil fatty acids at 2400 p.s.i.g. and about 200° C. using about 3 weight percent of cobaltous carbonate catalyst. The hydroxymethyl stearic acid was reduced to nonadecanediol by high pressure hydrogenation catalyzed with copper chromite. The following description briefly illustrates this method of reduction.

Approximately 510 parts of the hydroformylated stearic acid, 205 parts of n-propanol diluent and 25 parts of copper chromite catalyst were charged to a pressure reactor. The copper chromite catalyst contained 11 wt. percent of barium oxide, based on total catalyst weight, as a stabilizer. The hydrogenation was carried out at 3900 to 6300 p.s.i.g. and 250 to 270° C. for about five hours. The reaction mixture was filtered to remove the catalyst residues and the green-colored filtrate was stripped of the n-propanol by steam distillation. The crude nonadecanediol was treated with dilute hydrochloric acid during steaming, water-washed at about 90° C., then cooled to 25° C. to yield 490 parts of a white, waxy, solid cake.

The crude nonadecanediol was batch distilled at low pressure through a column 1¼ inches in diameter and 10 inches long partially packed with beryl saddles. Two main distilled fractions of fairly pure nonadecanediol were collected. The first fraction, collected at 161 to 170° C. and 0.030 to 0.065 mm. of Hg, had a hydroxyl number of 352. The second fraction, collected at 165 to 170° C. and 0.030 mm. of Hg, had a hydroxyl number of 364. These fractions comprised about 70% of the charge to the distillation pot, but it is apparent that the recovery would be much better in more sophisticated distillation apparatus. A portion of the second fraction was used to produce a polyurethane resin as described in parts B and C below.

B. PREPARATION OF PREPOLYMER

A prepolymer composition was prepared from the following recipe:

| | Parts | Mole Ratio |
|---|---|---|
| Nonadecanediol from A | 70 | 1.00 |
| Toluene diisocyanate, 80/20 | 79 | 2.00 |

The nonadecanediol was heated with agitation to 100° C. at 2 mm. Hg pressure in a glass tube reaction for about 10 minutes to insure substantially anhydrous conditions. The system was brought to atmospheric pressure and the toluene diisocyanate added with stirring. The tube was cooled in an ice-water bath to maintain the temperature of the reactants around 70-80° C. The reaction seemed to be completed in about an hour. The tube was sealed to prevent moisture contamination and the prepolymer, a clear viscous liquid, was allowed to cool to room temperature (23° C.), at which temperature it became cloudy and very viscous, almost a paste; it contained some gas bubbles.

C. PREPARATION OF THE POLYURETHANE RESIN

The prepolymer was degassed by heating to 100° C. under a vacuum (5 mm. Hg) to give a bubble-free, viscous liquid. The vacuum was removed and the following reactants were added to the prepolymer with stirring at 90 to 100° C. to give a clear solution.

| | Parts | Mole Ratio |
|---|---|---|
| 1,4-butanediol | 10.2 | 0.50 |
| Trimethylol propane | 10.1 | 0.33 |

Bubbles were removed from the solution by applying a slight vacuum (10 mm. Hg). The solution was poured at 100° C. into various molds and the polymer was cured at 130° C. in an oven for 16 hours to yield hard, impact resistant, water clear resin specimens on which samples the following physical data were obtained.

| | |
|---|---|
| Density at 23° C. (ASTM D1505-60T), gm./ml | 1.132 |
| Shore D Hardness (ASTM D1706-59T), degrees | 80 |
| Izod Impact Value (ASTM D256-56), ft.-lb./in | 2.74 |
| Tensile Strength (ASTM D638-60T, average of three samples) in lbs./sq. in.: | |
| At 23° C | 9,600 |
| At 100° C | 560 |
| At 23° C. after immersion in water at a temperature of 100° C. for— | |
| 2 days | 9,000 |
| 5 days | 8,500 |
| 7 days | 8,100 |
| At 23° C. after 7 days in Weather-Ometer | 9,300 |
| Water Absorption (ASTM D471-59T), immersion in water at 23° C. for 23 hours, percent: | |
| Weight increase | 0.35 |
| Volume increase | 0.15 |
| Immersion in dimethyl formamide for 7 days at 23° C | (¹) |
| Electrical Properties: | |
| D.C. Volume Resistivity (ASTM D991-48T) ohm-cm | 1.01×10¹⁶ |

Dielectric Properties (ASTM D150-59T):

| | At Frequency, Cycles/second | | | |
|---|---|---|---|---|
| | 10² | 10³ | 10⁴ | 10⁵ |
| Dielectric constant | 3.51 | 3.14 | 3.14 | 3.11 |
| Tan δ (loss angle) | 0.007 | 0.006 | 0.006 | 0.008 |

¹ Sample softened but not soluble.

*Example V*

The example illustrates the necessity for including the polyol cross-linking monomer in the polyurethane composition to achieve the desired properties of the resin. The instant recipe was:

| | Parts | Mole Ratio |
|---|---|---|
| Nonadecanediol, Example IV-A, distilled fraction No. 2 | 50 | 1.00 |
| Toluene diisocyanate, 80/20 | 56.6 | 2.00 |
| 1,4-butanediol | 14.6 | 1.00 |

The procedure was similar to that described in Example IV-B and C. The nonadecanediol was dried under vacuum at 100° C. The isocyanate was mixed with the diol to form the prepolymer. The butanediol was mixed with the prepolymer at 100° C. to form a clear solution which was degassed by applying a vacuum to the mixing flask. Sheets and blocks were cast and cured at 130° C. for 16 hours. The cooled resin was hard and transparent but very brittle as shown by its proneness to shatter when struck.

*Example VI*

A. PREPARATION OF HIGH-PURITY NONADECANEDIOL 1,000 grams of tall oil fatty acids ("Acintol FA-2") were oxoated in a 3 liter stainless steel autoclave at 2400 p.s.i.g. and 185° C. for 2 hours. The catalyst was 8 grams of cobaltous carbonate. The resulting, dark viscous liquid was subjected to a short period of steam injection and then treated with 50 ml. of dilute hydrochloric acid. This operation converted the catalyst to cobalt chloride which was extracted from the organic phase by an ethanol-water mixture. This was followed by several water washes of the organic phase. About 100 grams of tetrahydrofuran were added to the oily product to make it more fluid for filtration through a medium porosity sintered glass filter for removal of cobalt metal. The solvent and residual water were stripped by rotoevaporation.

500 grams of the hydroxymethyl stearic acid, a clear yellow oil, were reduced using 100 grams of LiAlH₄ with 3 liters of tetrahydrofuran as the solvent. The reaction was carried out at reflux (65° C.) for 90 minutes. The reaction mixture contained a gray precipitate in the THF diluent.

The above mixture was cooled to room temperature, methanol added to decompose the remaining LiAlH₄, followed by treatment with 200 ml. of dilute hydrochloric acid. The organic phase was separated from the aqueous layer, washed with salt water, and dried over anhydrous MgSO₄. The tetrahydrofuran was further removed in a rotoevaporator operated at 80° C. and 70 mm. Hg. The crude nonadecanediol, hydroxyl number of 323, was a tan colored solid at room temperature. 420 grams were recovered.

The crude nonadecanediol was refined by distillation at an absolute pressure of 0.070 to 0.08 mm. of Hg. The distillation apparatus was a glass flask equipped with a column 1.25 inches in diameter and ten inches long, half of its length packed with beryl saddles. The results of the distillation are tabulated below.

| Fraction No. | Overhead Temp., ° C. | Weight Percent | Hydroxyl No. |
|---|---|---|---|
| 1 | 115–132 | 11 | 197 |
| 2 | 132–139 | 4 | 234 |
| 3 | 148–156 | 1.5 | |
| 4 | 157–164 | 58.5 | 368 |
| Residue | | 25 | 288 |

Fraction 4 was a relatively pure mixture of nonadecanediol isomers (theoretical OH number=374).

B. PREPARATION OF THE POLYURETHANE RESIN

Several batches of polyurethane resin were made using the diol recovered above as Fraction 4 and the recipe and prepolymer preparation procedure as described in Example IV. Sheets and disks, which were cast from the resin, cured for one hour at 130° C., and then cooled to room temperature, were hard, impact-resistant, colorless and transparent. A 0.1 inch thick disk was not cracked by repeated blows with a steel hammer nor by a nail driven through it.

Various small electrical and electronic devices such as resistors, capacitors, and switches were coated with or encapsulated in the resin in the following manner. The ingredients for producing the polyurethane were mixed as described previously and degassed at 100° C. and 2 mm. Hg with stirring for two minutes. The solution was poured into Teflon coated aluminum containers into which the electrical components were suspended by wire leads. The containers were held in a 120° C. oven for about 16 hours. The electrical components were removed from the containers after cooling to room temperature. The various devices were obtained in bubble-free, transparent, colorless, resin encapsulations of about one to two inch thickness. The components were tested and all were in perfect operating condition.

We claim:

1. A polyurethane composition characterized by being heat curable to yield a hard, impact-resistant, electrical resistive resin comprising the reaction product obtained by reacting a mixture comprising (1) one mole of nonadecanediol represented by the structure

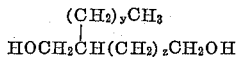

wherein y and z are both integers within the range of 0 to 15 and the total of integers y and z is always 15; (2) from about 1.5 to 3 moles of a diisocyanate selected from the group consisting of aromatic and cycloaliphatic diisocyanates; (3) from about 0.4 to 1.9 moles of a saturated, aliphatic glycol having from 4 to 10 carbon atoms; and (4) from about 0.07 to 1.1 moles of an aliphatic polyol miscible with reactants (1), (2) and (3), and having from 3 to 40 carbon atoms and from 3 to 8 hydroxyl groups selected from the group consisting of primary and secondary hydroxyl radicals, said polyol being free of nitro groups and amino hydrogen atoms, the molar amounts of said reactants (2), (3) and (4) being adjusted within the said ranges whereby there are essentially no unreacted groups of the class consisting of isocyanate and hydroxyl groups in said reaction product.

2. The composition according to claim 1 wherein the diisocyanate is a mixture of 2,4-toluene diisocyanate and 2,6-toluene diisocyanate, the glycol is 1,4-butanediol and the polyol is a trihydric alcohol.

3. A polyurethane composition characterized by being heat curable to yield a hard, impact-resistant, electrical resistive resin comprising the reaction product obtained by reacting a mixture comprising (1) one mole of nonadecanediol represented by the structure

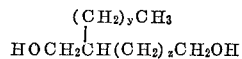

wherein y and z are both integers within the range of 0 to 15 and the total of integers y and z is always 15; (2) about two moles of a diisocyanate selected from the group consisting of aromatic and cycloaliphatic diisocyanates; (3) about 0.5 mole of a saturated, aliphatic glycol having from 4 to 8 carbon atoms; and (4) from about 0.12 to 0.33 mole of an aliphatic polyol miscible with reactants (1), (2) and (3), and having from 3 to 40 carbon atoms and from 3 to 8 hydroxyl groups selected from the group consisting of primary and secondary hydroxyl radicals, said polyol being free of nitro groups and amino hydrogen atoms, the molar amounts of said polyol being adjusted within the said range whereby there are essentially no unreacted groups of the class consisting of isocyanate and hydroxyl groups in said reaction product.

4. A polyurethane composition characterized by being heat curable to yield a hard, impact-resistant, electrical resistive resin comprising the reaction product obtained by reacting a mixture comprising (1) one mole of nonadecanediol represented by the structure

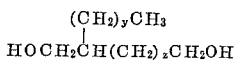

wherein y and z are both integers within the range of 0 to 15 and the total of integers y and z is always 15; (2) about two moles of an aromatic diisocyanate; (3) about 0.5 mole of a saturated, aliphatic glycol having from 4 to 8 carbon atoms; and (4) about 0.33 mole of an aliphatic triol miscible with reactants (1), (2) and (3), and having from 3 to 40 carbon atoms and its hydroxyl groups selected from the group consisting of primary and secondary hydroxyl radicals, said triol being free of nitro groups and amino hydrogen atoms.

5. The composition according to claim 4 wherein the diisocyanate is toluene diisocyanate, the glycol is 1,4-butanediol and the triol is trimethylol propane.

6. The method for preparing a polyurethane composition characterized by being heat curable to form a hard, impact-resistant, electrical resistive resin which comprises reacting a mixture comprising (1) one mole of nonadecanediol represented by the structure

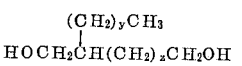

wherein y and z are both integers within the range of 0 to 15 and the total of integers y and z is always 15; (2) from about 1.5 to 3 moles of a diisocyanate selected from the group consisting of aromatic and cycloaliphatic diisocyanates; (3) from about 0.4 to 1.9 moles of a saturated, aliphatic glycol having from 4 to 10 carbon atoms; and (4) from about 0.07 to 1.1 moles of an aliphatic polyol miscible with reactants (1), (2) and (3), and having from 3 to 40 carbon atoms and from 3 to 8 hydroxyl groups selected from the group consisting of primary and secondary hydroxyl radicals, said polyol being free of nitro groups and amino hydrogen atoms, the molar amounts of said reactants (2), (3) and (4) being adjusted within the said ranges whereby there are essentially no unreacted groups of the class consisting of isocyanate and hydroxyl groups in the polyurethane composition.

7. The method for preparing a polyurethane composition characterized by being heat curable to form a hard, impact-resistant, electrical resistive resin which comprises the steps of (A) reacting a mixture comprising one mole of nonadecanediol represented by the structure

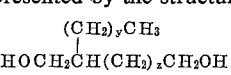

wherein y and z are both integers within the range of 0 to 15 and the total of integers y and z is always 15, and from about 1.5 to 3 moles of a diisocyanate selected from the group consisting of aromatic and cycloaliphatic diisocyanates, and (B) reacting wtih mixture (A), at a temperature of about 70 to about 100° C., from about 0.4 to 1.9 moles of a saturated, aliphatic glycol having from 4 to 10 carbon atoms, and from about 0.07 to 1.1 moles of an aliphatic polyol miscible with said other reactants, and having from 3 to 40 carbon atoms and from 3 to 8 hydroxyl groups selected form the group consisting of primary and secondary hydroxyl radicals, said polyol being free of nitro groups and amino hydrogen atoms, the molar amounts of said reactants being adjusted within the said ranges whereby there are essentially no unreacted groups of the class consisting of isocyanate and hydroxyl groups in the polyurethane composition.

8. The method for preparing a polyurethane composition characterized by being heat curable to form a hard, impact-resistant, electrical resistive resin which comprises the steps of (A) reacting a mixture comprising about one mole of nonadecanediol represented by the structure

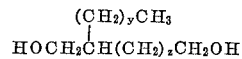

wherein y and z are both integers within the range of 0 to 15 and the total of integers y and z is always 15, and about two moles of toluene diisocyanate, and (B) reacting with mixture (A), at a temperature of about 70 to about 100° C., about 0.5 mole of 1,4-butanediol and about 0.33 mole of trimethylol propane.

No references cited.

LEON J. BERCOVITZ, *Primary Examiner.*

M. C. JACOBS, *Assistant Examiner.*